(12) United States Patent
Tian

(10) Patent No.: US 9,206,354 B1
(45) Date of Patent: Dec. 8, 2015

(54) LIQUID CRYSTAL COMPOUND AND METHODS FOR THE PREPARATION THEREOF

(71) Applicant: Boe Technology Group Co., Ltd., Beijing (CN)

(72) Inventor: Xiaoxiong Tian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/500,499

(22) Filed: Sep. 29, 2014

(30) Foreign Application Priority Data

May 23, 2014 (CN) .......................... 2014 1 0222125

(51) Int. Cl.
*G02F 1/1333* (2006.01)
*C09K 19/32* (2006.01)
*C09K 19/52* (2006.01)

(52) U.S. Cl.
CPC ................. *C09K 19/32* (2013.01); *C09K 19/52* (2013.01)

(58) Field of Classification Search
CPC ....... C09K 19/32; C09K 19/52; G02F 1/1333
USPC ............... 252/299.01, 299.6, 299.61, 299.62, 252/299.63; 428/1.1, 1.3; 349/182; 585/25, 585/26
See application file for complete search history.

(56) References Cited

U.S. PATENT DOCUMENTS

| 7,790,057 B2 * | 9/2010 | Busing .................. C07C 17/269 252/301.16 |
| 8,581,262 B2 * | 11/2013 | Pan ........................ B82Y 10/00 257/40 |
| 8,986,852 B2 * | 3/2015 | Stoessel .................. C07C 15/28 257/40 |

FOREIGN PATENT DOCUMENTS

| CN | 1820062 | 8/2006 |
| CN | 103146375 | 6/2013 |

OTHER PUBLICATIONS

Office action from Chinese Application No. 201410222125.9 dated Feb. 3, 2015.

\* cited by examiner

*Primary Examiner* — Geraldina Visconti
(74) *Attorney, Agent, or Firm* — Calfee, Halter & Griswold LLP

(57) ABSTRACT

The disclosure relates to a liquid crystal compound having a structure of the general formula P2, wherein, R1 represents C1-C8 alkyl, R2 and R3, which independently represent C1-C6 alkyl, and R4 represents C1-C6 alkyl. The disclosure also relates to a process for the preparation of the liquid crystal compound, a liquid crystal composition comprising the liquid crystal compound, and a liquid crystal display panel comprising the liquid crystal compound.

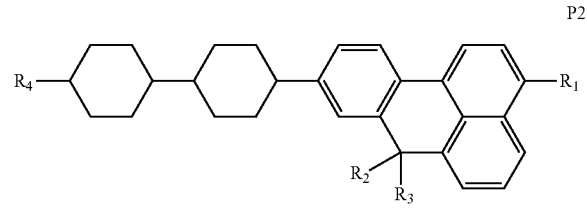

12 Claims, 1 Drawing Sheet

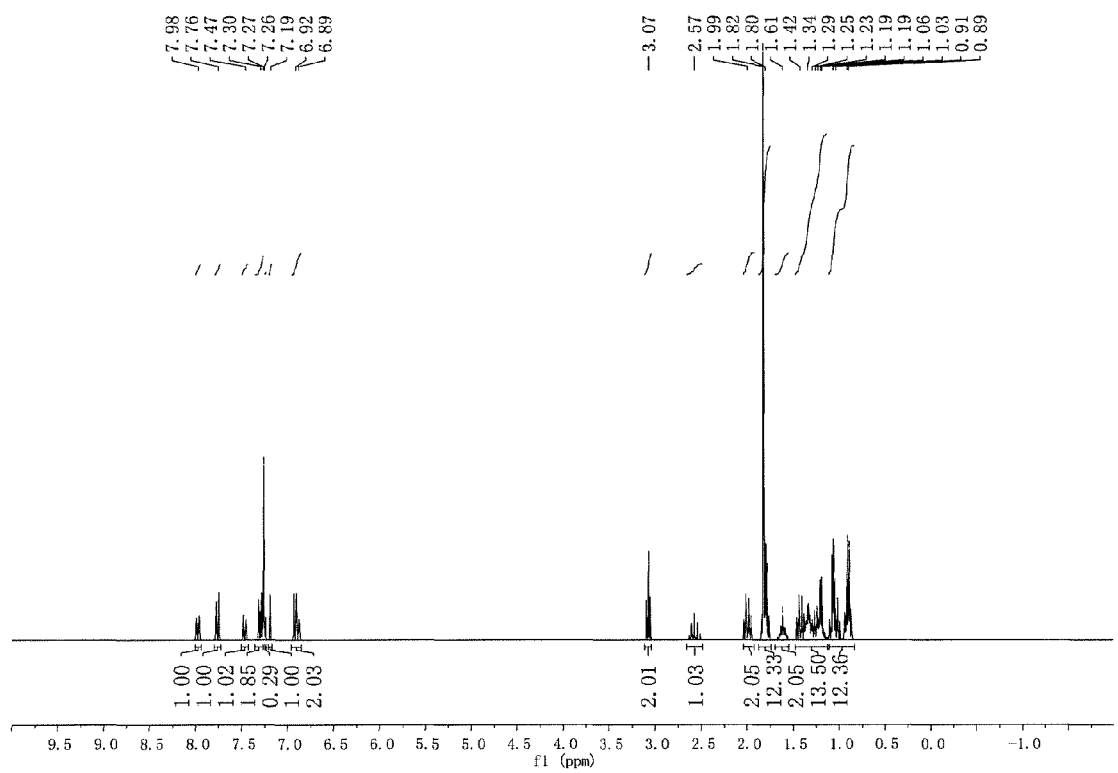

LIQUID CRYSTAL COMPOUND AND METHODS FOR THE PREPARATION THEREOF

RELATED APPLICATIONS

The present application claims the benefit of Chinese Patent Application No. 201410222125.9, filed May 23, 2014, the entire disclosure of which is incorporated herein by reference.

FIELD

The general inventive concepts relate to liquid crystal displays, and more particularly relate to liquid crystal compounds, processes for the preparation thereof, liquid crystal compositions, processes for the preparation thereof, and a liquid crystal display panel.

BACKGROUND

In flat panel display devices, a Thin Film Transistor Liquid Crystal Display (TFT-LCD) is generally characterized by a relatively small volume, low power consumption, low manufacture cost and little radiation. Due to this, it occupies a dominant position in the current flat panel display market.

Liquid crystal displays are widely used in every aspect of modern life. With the development of liquid crystal display technology to date, a variety of liquid crystal compounds have been practically applied. The properties of the individual liquid crystal compounds, including phase change temperature, optical anisotropy, dielectric anisotropy, viscosity and electric resistance, have a great influence on the final application of the liquid crystal material. The development of new liquid crystal compounds and new compositions containing the liquid crystal compounds is very important for improving the various properties of liquid crystal materials.

The clearing point of existing liquid crystal materials generally is relatively low, about 100° C., which limits the application scope of the liquid crystal displays. Therefore, there exists a need for liquid crystal materials with a high clearing point.

SUMMARY

To this end, an object of the general inventive concepts is to provide a liquid crystal compound and a preparation process thereof, a liquid crystal composition containing the liquid crystal compound, a preparation process thereof, and a liquid crystal display panel containing the liquid crystal compound. Since the liquid crystal compound has a high clearing point, the application scope of the liquid crystal materials containing the liquid crystal compound can be broadened greatly.

The disclosure firstly relates to a new liquid crystal compound of 7-hydrogen benzo[de]anthracene type, of which the structure corresponds to the following general formula P2 (hereinafter also called "liquid crystal compound P2" or "compound P2"):

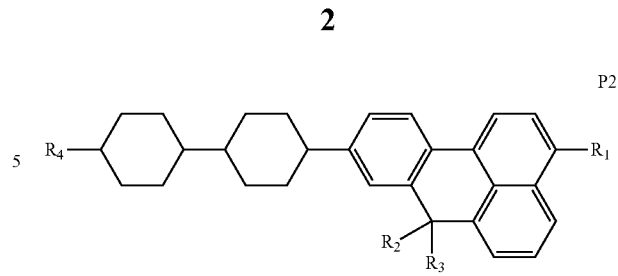

wherein, R1 is C1-C8 alkyl, R2 and R3, independently are C1-C6 alkyl, and R4 is C1-C6 alkyl.

The disclosure also relates to a process for the preparation of a liquid crystal compound P2, comprising the following steps:

(1) conducting a bromination of compound P2-1 with N-bromosuccinimide (NBS) in tetrahydrofuran to obtain compound P2-2; the reaction is shown as follows:

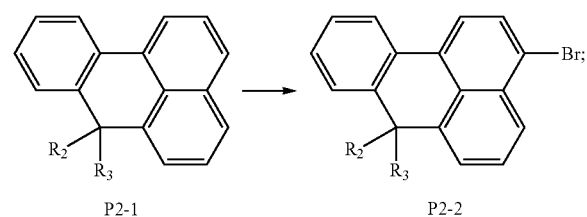

(2) reacting compound P2-2, obtained in Step (1), with C1-C8 alkyl magnesium bromide in toluene in the presence of a catalyst, to obtain compound P2-3; the reaction is shown as follow:

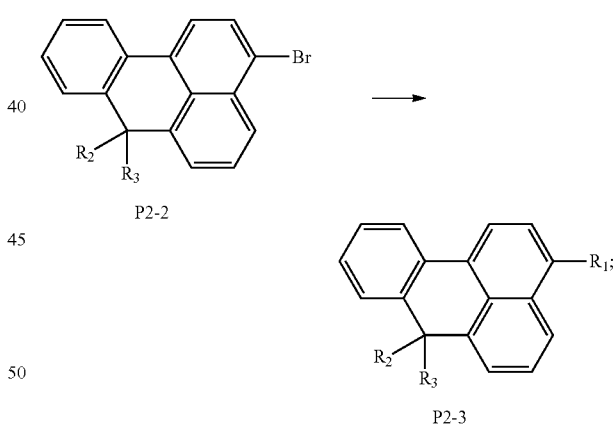

(3) conducting a bromination of compound P2-3, obtained in Step (2), with bromine in tetrahydrofuran, to obtain compound P2-4; the reaction is shown as follow:

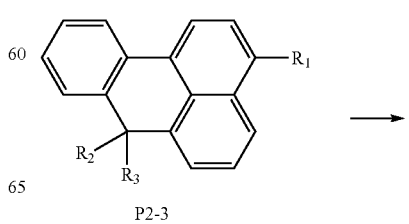

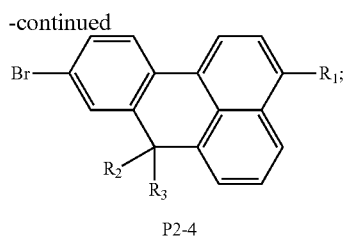

P2-4

(4) preparing a Grignard reagent from compound P2-4, then conducting an addition reaction of the Grignard reagent with compound

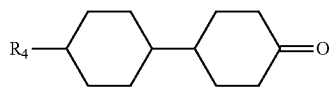

in tetrahydrofuran, followed by a dehydration reaction, and then a reduction reaction, to obtain compound P2; the reaction is shown as follow:

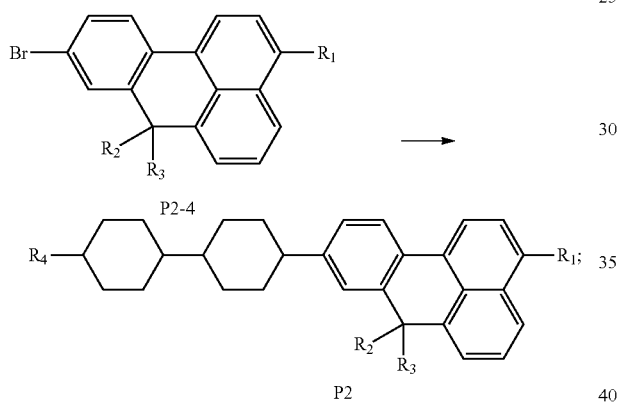

wherein, R1, R2, R3 and R4 are as above defined.

The disclosure also relates to a liquid crystal composition comprising at least one of the liquid crystal compounds as above defined.

The disclosure also relates to a process for the preparation of a liquid crystal composition, including a step of mixing all the components of the liquid crystal composition according to the disclosed weight percentages.

The disclosure also relates to a liquid crystal display panel which comprises at least one liquid crystal compound P2 as defined above.

BRIEF DESCRIPTION OF THE FIGURE

Several technical aspects of the present disclosure will be described in more detail below with reference to the accompanying drawings in order for those skilled in the art to be able to carry out the embodiments of present disclosure. The present disclosure may, however, be embodied in many different forms and should not be construed as limited to the exemplary embodiments set forth herein. In particular, the general inventive concepts are not intended to be limited by the various illustrative embodiments disclosed herein.

FIG. 1 represents the 1H-NMR spectrum of a liquid crystal compound obtained in Example 1.

DETAILED DESCRIPTION

The present invention and associated general inventive concepts will be further described hereinafter in detail with reference to the accompanying drawings and various exemplary embodiments. One of ordinary skill in the art will appreciate that these exemplary embodiments only constitute a fraction of the possible embodiments encompassed by the present invention and associated general inventive concepts. As such, the scope of the present disclosure is by no means limited to the exemplary embodiments set forth herein.

In order to widen the application scope of liquid crystal materials, this disclosure provides new liquid crystal compounds having a relative high clearing point. It has surprisingly been found that liquid crystal compound P2, when it contains a bi-cyclohexyl moiety, has a clearing point much higher than corresponding liquid crystal compounds containing a cyclohexyl moiety. This finding is unexpected to those skilled in the art, because the clearing point of liquid crystal compounds generally are affected strongly by the core structure of the compound (for example, for liquid crystal compound P2, the core structure corresponds to 7-hydrogen benzo[de]anthracene), but the effects of the substituent groups are relatively weak. A liquid crystal material made of the liquid crystal composition comprising the liquid crystal compound P2 has a clearing point higher than 130° C., much higher than that of the existing liquid crystal materials. The higher clearing point can greatly broaden the application scope of liquid crystal display panels employing these materials.

The disclosure firstly relates to a liquid crystal compound, which has the following structural formula P2:

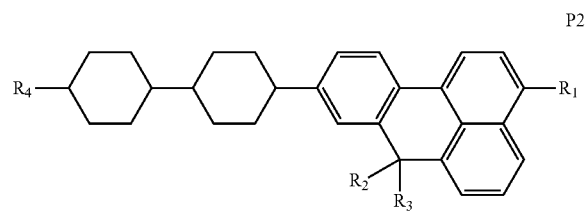

P2 wherein, R1 is C1-C8 alkyl, R2 and R3, independently are C1-C6 alkyl, R4 is C1-C6 alkyl.

According to an embodiment, in the above formula P2, R1 is C3-C6 alkyl, R2 and R3, independently are C1-C3 alkyl, R4 is C2-C4 alkyl.

According to an embodiment, the liquid crystal compound has the following structural formula:

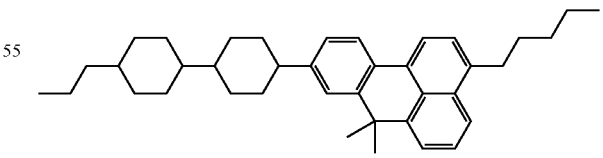

Compound P2 is a new liquid crystal compound of 7-hydrogenbenzo[de]anthracene type, which has a higher clearing point of up to 295° C., a good physical and chemical stability This disclosure also relates to a process for the preparation of a liquid crystal compound comprising the following steps:

Step (1), conducting a bromination of compound P2-1 with N-bromosuccinimide (NBS) in tetrahydrofuran to obtain compound P2-2; wherein the molar ratio of compound P2-1 to NBS is 1:1 to 1:1.1, the reaction temperature is 17 to 60° C., the reaction time is 20 to 80 minutes, and the ratio of the mole number (in mol) of compound P2-1 to the volume of tetrahydrofuran (in ml) can be 1:500 to 1:50000; the reaction is shown as follows:

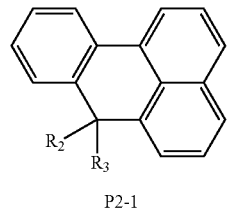

P2-1

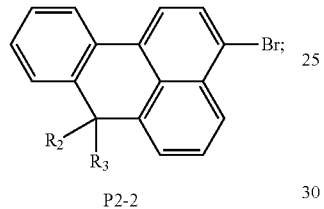

P2-2

Step (2), reacting compound P2-2, obtained in Step (1), with C1-C8 alkyl magnesium bromide in toluene in the presence of a catalyst such as tetrakis(triphenylphosphine)palladium(0), to obtain compound P2-3; wherein the molar ratio of compound P2-2 to the C1-C8 alkyl magnesium bromide is 1:1.5 to 1:5, the reaction temperature is 0 to 40° C., the reaction time is 1 to 8 hours, and the ratio of the mole number (in mol) of compound P2-2 to the volume of toluene (in ml) may be 1:500 to 1:50000; the reaction is shown as follows:

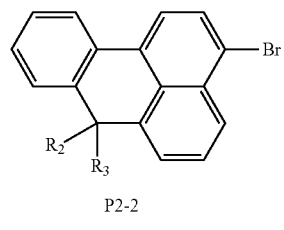

Step (3), conducting a bromination of compound P2-3, obtained in Step (2), with bromine in tetrahydrofuran to obtain compound P2-4; wherein the molar ratio of compound P2-3 to bromine is 1:1 to 1:1.5, the reaction temperature is 0 to 20° C., and the reaction time is 1 to 8 hours; the reaction is shown as follows:

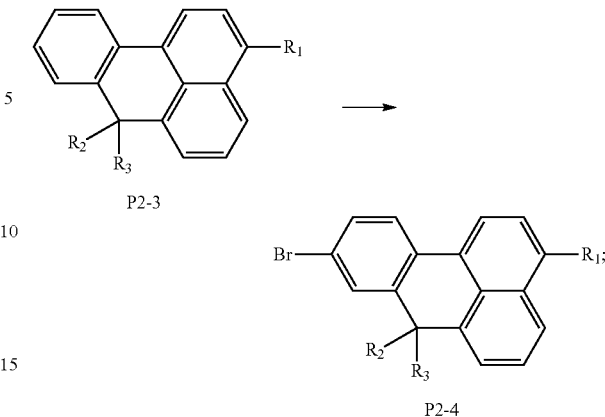

Step (4), firstly preparing a Grignard reagent from compound P2-4, then conducting an addition reaction of the Grignard reagent with compound

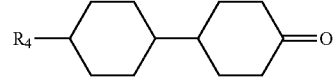

in tetrahydrofuran, followed by a dehydration reaction, and then a reduction reaction, to obtain compound P2; wherein the molar ratio of compound P2-4 to compound

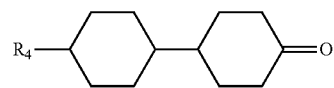

is 1:1 to 1:1.2, the reaction temperature is 10 to 80° C., and the reaction time is 1 to 5 hours; the reaction is shown as follows:

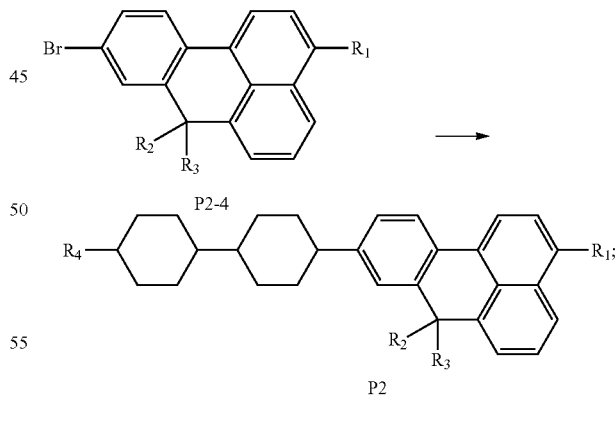

wherein, R1, R2, R3 and R4 are as defined above.

According to an exemplary embodiment, in Step (1), the molar ratio of compound P2-1 to N-bromosuccinimide is from 1:1 to 1:1.05, the reaction temperature is 40° C., and the reaction time is 30 to 40 minutes;

in Step (2), the molar ratio of compound P2-2 to the C1-C8 alkyl magnesium bromide is 1:1.5 to 1:2, the reaction temperature is 30° C., and the reaction time is 3 hours;

in Step (3), the molar ratio of compound P2-3 to bromine is 1:1 to 1:1.2, the reaction temperature is 10° C., and the reaction time is 2 to 5 hours;

in Step (4), the molar ratio of compound P2-4 to compound

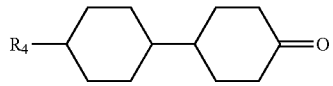

is 1:1 to 1:1.1, the reaction temperature is 60° C., and the reaction time is 3 hours; wherein, R1, R2, R3 and R4 are as above defined.

The disclosure also relates to a liquid crystal composition comprising at least one liquid crystal compound as above defined.

According to an exemplary embodiment, a liquid crystal composition comprises from 1% to 30% by weight of at least one liquid crystal compound P2, relative to the total weight of the liquid crystal composition.

According to an exemplary embodiment, a liquid crystal composition comprises from 5% to 20% by weight of at least one liquid crystal compound P2, relative to the total weight of the liquid crystal composition.

According to an exemplary embodiment, a liquid crystal composition, comprises 1% to 30% by weight of liquid crystal compound P2, preferrably 8% to 15% by weight of liquid crystal compound P2, as well as:

0%-6% by weight, preferably 2%-5% by weight of compound A

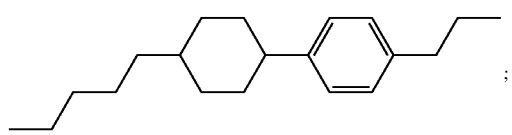

0%-4% by weight, preferably 1%-3% by weight of compound B:

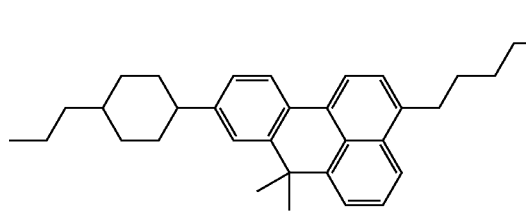

10%-18% by weight, preferably 13%-15% by weight of compound C:

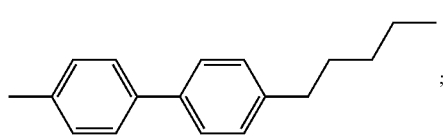

12%-33% by weight, preferably 10%-20% by weight of compound D:

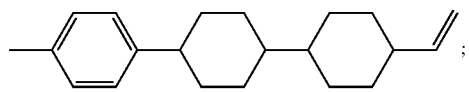

11%-12% by weight by weight of compound E:

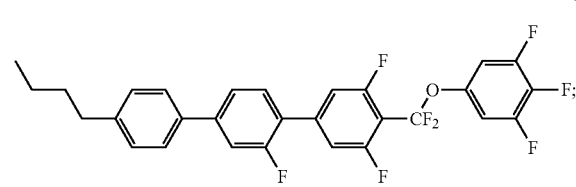

6%-12% by weight, preferably 8%-10% by weight of compound F:

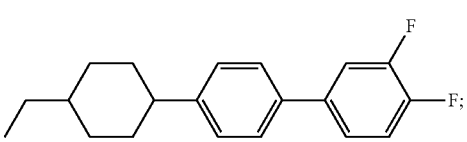

0%-10% by weight, preferably 3%-6% by weight of compound G:

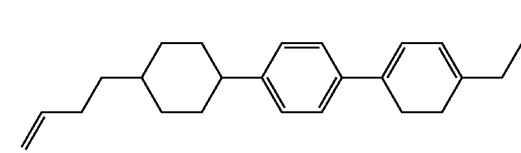

11%-20% by weight, preferably 14%-18% by weight of compound H:

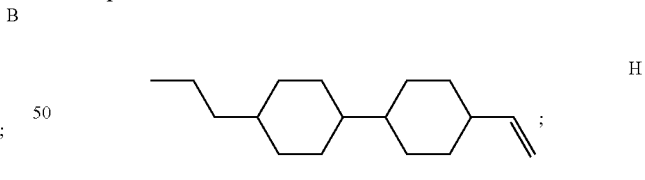

0%-12% by weight, preferably 4%-8% by weight of compound I:

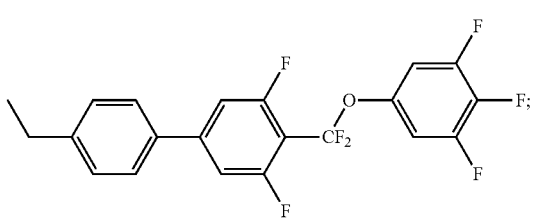

relative to the total weight of the liquid crystal composition.

According to an exemplary embodiment, a liquid crystal composition comprises 3% by weight of compound A, 2% by weight of compound B, 13% by weight of compound C, 15% by weight of compound D, 12% by weight of compound E, 8% by weight of compound F, 6% by weight of compound G, 16% by weight of compound H, 6% by weight of compound I, and 19% by weight of liquid crystal compound P2, relative to the total weight of the liquid crystal composition.

This disclosure also relates to a process for the preparation of a liquid crystal composition, including mixing the compounds that make up the liquid crystal composition. More specifically, the liquid crystal composition is obtained by mixing the compounds of the composition according to the contents as defined above, in any order, under stirring.

This disclosure also relates to a liquid crystal display panel, wherein the liquid crystal display panel comprises 1% to 30% by weight of at least one of: a liquid crystal compound P2 as defined above; and a liquid crystal composition as defined above.

According to an exemplary embodiment, a liquid crystal display panel comprises a first substrate, a second substrate placed on a box, and a liquid crystal layer located between the first substrate and the second substrate, wherein the liquid crystal layer comprises at least one of: a liquid crystal compound P2 as defined above; and a liquid crystal composition as defined above.

The following examples further describe and demonstrate specific embodiments within the scope of the present invention. The examples are given solely for the purpose of illustration and are not to be construed as limitations of the present invention, as many variations thereof are possible without departing from the spirit and scope of the invention.

EXAMPLES

Synthesis Examples 1

Preparation of the Compound of the Following Formula

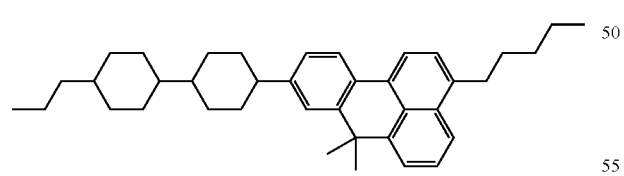

Step (1), in a round bottom flask, 2.5 g of compound formula 2-1 is fully dissolved in 50 ml tetrahydrofuran under stirring, then 2.0 g of N-bromosuccinimide (NBS) was added under stirring to carry out a bromination reaction at temperature of 40° C.; after the reaction ended, 80 ml of water was added, and yellowish solid precipitate was produced. The solid was filtered, dried and analyzed by NMR and mass spectrometry. The measurements show that the obtained solid was a compound having general formula 2-2; wherein the reaction is shown as follows:

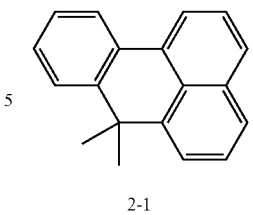

2-1

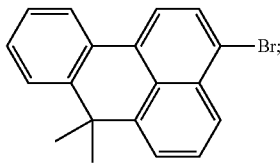

2-2

Step (2), at room temperature, 2.9 g of the product of formula 2-2, obtained in step (1), and 50 ml of toluene were added into a round bottom flask, then a catalytic amount (0.1 g) of tetrakis(triphenylphosphine)palladium was added under stirring, and the temperature was controlled at 30° C. 27 g of 15% of pentyl magnesium bromide in ether was added into the flask dropwise. After 3 hours, water was added and the organic phase was separated in separating funnel. The organic phase was decolorized via silica gel column, then subjected to an evaporation to remove the solvent, followed by vacuum distillation. The obtained product was determined by NMR and mass spectrometry to have the following formula 2-3; wherein the reaction is shown as follows:

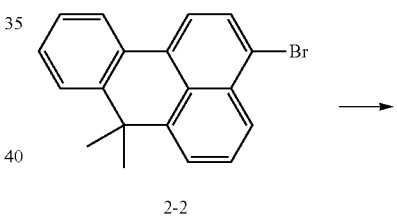

2-2

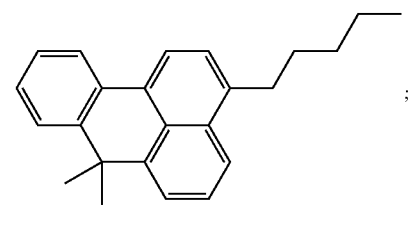

2-3

Step (3), in a round bottom flask, 2.55 g of 2-3, obtained in step (2), was dissolved in 50 ml of tetrahydrofuran under stirring, and the temperature was controlled at 10° C. 1.2 g of bromine was added under stirring to conduct a bromination reaction, wherein the reaction time was 2 hours. After the reaction was finished, the obtained reaction mixture was washed with 10% sodium sulfite solution and the organic phase was separated in separating funnel. The organic phase was decolorized via silica gel column and subjected to an evaporation to remove the solvent. The obtained product was recrystallized in the 50/50 ethanol/toluene; the obtained crystal was determined by NMR and mass spectrometry to have structural formula 2-4; wherein the reaction is shown as follows:

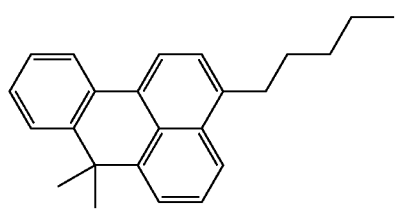

2-3

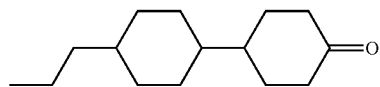

2-4

Step (4), 0.28 g metal magnesium powder, 5 ml tetrahydrofuran, and a small amount of 1,2-dibromoethane were added into a three-necked bottle. Then a mixture of 3.5 g crystal of formula 2-4 and 30 ml tetrahydrofuran was added dropwise. After the addition, the reaction medium was heated to reflux for 30 minutes, to obtain a Grignard reagent solution. Then the Grignard reagent solution was cooled to 20° C., and a mixture of 2.56 g

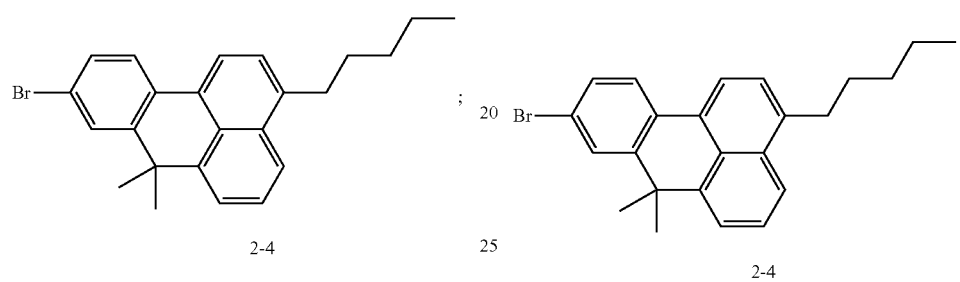

and 10 ml tetrahydrofuran was added dropwise. After the addition, the reaction medium was heated to reflux for 3 hours. After the reaction ended, a solution of ammonium chloride was added to conduct a hydrolysis reaction; after the hydrolysis reaction ended, the organic phase was separated in separating funnel and then concentrated to dryness. Then 100 ml of toluene, 1 g p-toluene sulfonic acid were added, and the mixture was heated to reflux for 5 hours to conduct a dehydration, wherein the water produced by the dehydration was removed by azeotropy. After the dehydration was finished, the mixture was cooled to room temperature and an appropriate amount of water was added and the organic phase was separated in separating funnel. Then the organic phase was concentrated to dryness, and subjected to a crystallization in ethanol to obtain an intermediate.

The intermediate was dissolved in the 50/50 toluene/ethyl acetate, and a catalytic amount of Pd/C was added; nitrogen was injected into the reactor to replace the air in the reactor, then hydrogen was injected to replace the nitrogen present in the reactor, and the pressure of hydrogen was maintained at the pressure of 0.1 MPa in the reactor for 1 hour. After the reduction by hydrogen, the catalyst was removed by filtration, and the organic phase was concentrated to dryness and subjected to a recrystallization in 50/50 toluene/ethyl acetate, to obtain a white crystal. The white crystal was determined by NMR and mass spectrometry (MS=518.36) to have structural formula 2-5. For the sake of simplicity, the obtained liquid crystal compound is represented by "compound 2-5" in the following; according to the IUPAC nomenclature, the obtained liquid crystal compound is named as 7,7-dimethyl-3-pentyl-9-(4'-propyl-[1,1'-bi-(cyclohexan)]-4-yl)-7H-benzo[de]anthracene; wherein the reaction is shown as follows:

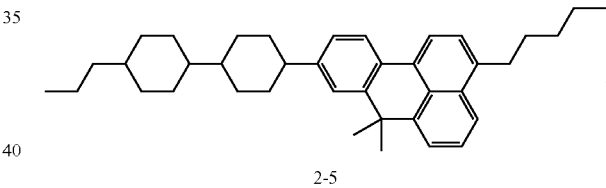

2-4

2-5

The clearing point of the liquid crystal compound or composition were measured according to the methods described in the Test Method of the Performances of Liquid Crystal Material issued by the Ministry of Information Industry of the People's Republic of China (SJ 20746-1999). According to the measurement, liquid crystal compound 2-5 obtained above has a clearing point of 295° C.

Example 2 and 3

Liquid Crystal Composition

The following non limiting Examples 2 and 3 are used to illustrate the liquid crystal compositions concerned in the present disclosure. Tables 1 and 2 show the weight percentage of each compound contained in the liquid crystal compositions of Examples 2 to 3 respectively, wherein the compound 2-5 was obtained according to the above Example 1. The liquid crystal compositions were obtained by mixing all the compounds according to the weight percentages shown in following Tables 1 and 2.

TABLE 1
| Compound | Content (wt. %) |
|---|---|
| 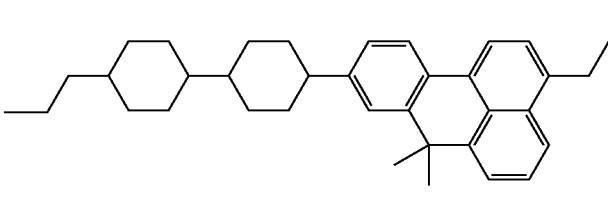<br>2-5 | 19 |
| 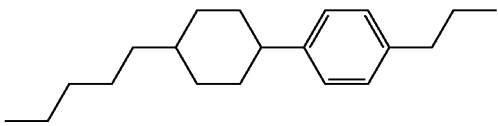<br>A | 3 |
| 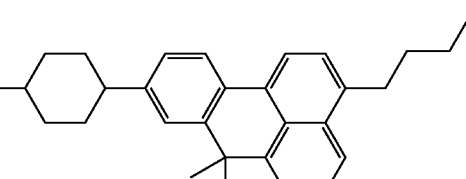<br>B | 2 |
| 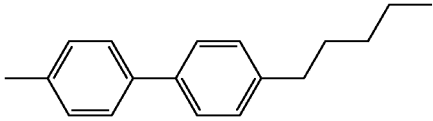<br>C | 13 |
| 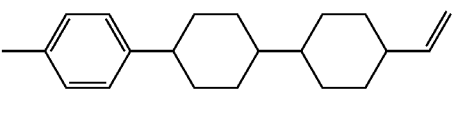<br>D | 15 |
| 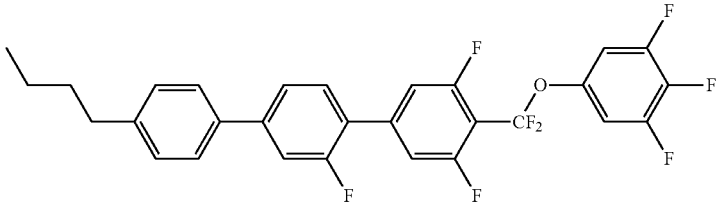<br>E | 12 |
| 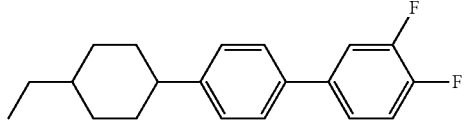<br>F | 8 |
| 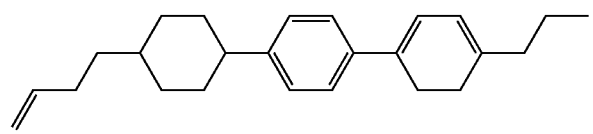<br>G | 6 |

TABLE 1-continued
| Compound | Content (wt. %) |
|---|---|
| 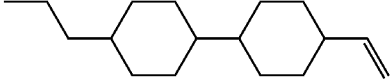<br>H | 16 |
| 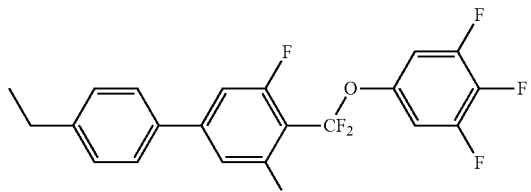<br>I | 6 |
TABLE 2
| Compound | Content (wt. %) |
|---|---|
| 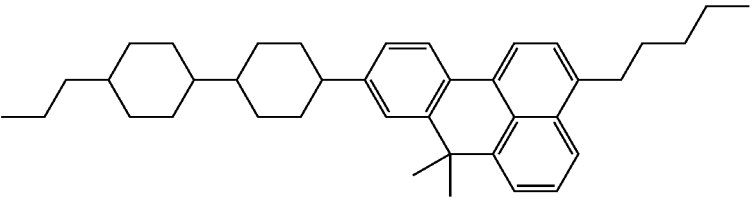 [SMILES: CCCCCc1ccc2c3c(cccc13)C(C)(C)c1cc(C3CCC(C4CCC(CCC)CC4)CC3)ccc1-2]<br>2-5 | 15 |
| 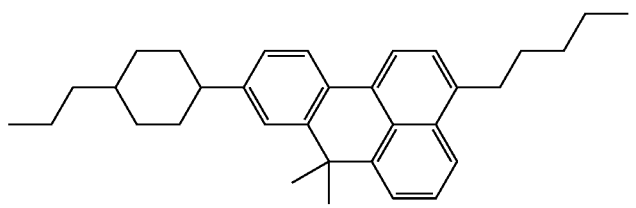<br>B | 4 |
| 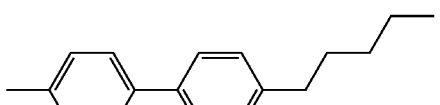<br>C | 10 |
| 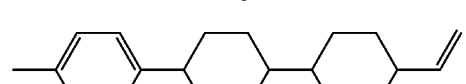<br>D | 12 |
| 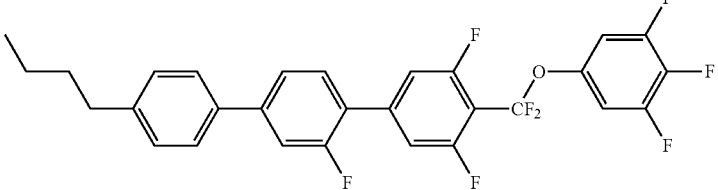<br>E | 11 |

TABLE 2-continued

| Compound | Content (wt. %) |
|---|---|
| 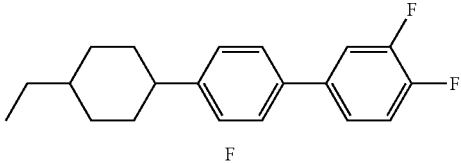<br>F | 6 |
| 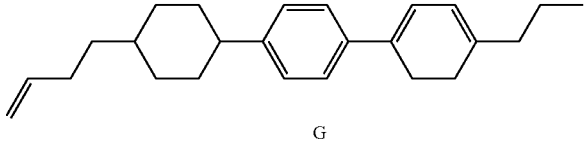<br>G | 10 |
| 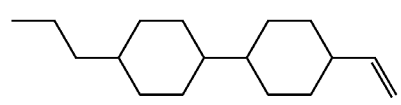<br>H | 20 |
| 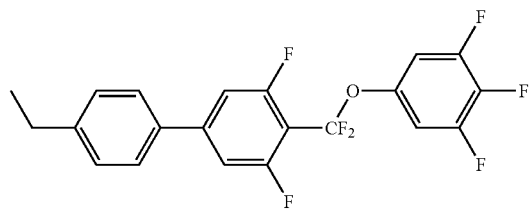<br>I | 12 |

Comparative Examples 4 and 5

The compositions of Comparative Examples 4 and 5 were respectively prepared according to the weight content of each compound in Examples 2 and 3, but the difference was that, in Comparative Examples 4 and 5, compound B was used to replace compound 2-5 in Examples 2 and 3:

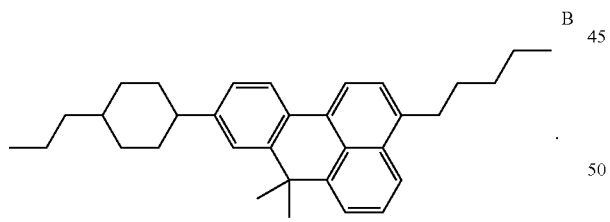

B

According to the results of the clearing point of compounds 2-5 and B and of the liquid crystal compositions of Examples 2 to 5, the clearing point of compound B is about 255° C., while the clearing point of liquid crystal compound 2-5 is about 295° C. Furthermore, the clearing point of the compositions of Examples 2 and 3 containing liquid crystal compound 2-5 of the invention respectively have a clearing point of 182° C. and 168° C., while the liquid crystal compositions of Comparative Example 4 and 5 have respectively a clearing point of 120° C. and 123° C. Moreover, both liquid crystal compound 2-5 and the compositions of Examples 2 and 3 also have a good balance of physical and chemical properties, such as stability, optical anisotropy, dielectric anisotropy, viscosity and electric resistance. The higher clearing point of the liquid crystal composition can greatly broaden the application range of liquid crystal materials made of the liquid crystal composition.

Although the present disclosure has been described with reference to specific embodiments, it should be understood that the limitations of the described embodiments are provided merely for purpose of illustration and are not intended to limit the present invention and associated general inventive concepts. Instead, the scope of the present invention is defined by the appended claims, and all variations and equivalents that fall within the range of the claims are intended to be embraced therein. Thus, other embodiments than the specific exemplary ones described herein are equally possible within the scope of these appended claims.

What is claimed is:
1. A liquid crystal compound, having general formula P2:

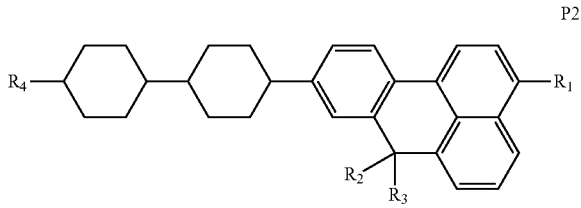

P2 wherein, R1 is C1-C8 alkyl, R2 and R3, are C1-C6 alkyl, and R4 is C1-C6 alkyl.

2. The liquid crystal compound according to claim 1, wherein R1 is C3-C6 alkyl, R2 and R3, independently are C1-C3 alkyl, R4 is C2-C4 alkyl.

3. The liquid crystal compound according to claim 1, wherein the liquid crystal compound has a structure of the following general formula:

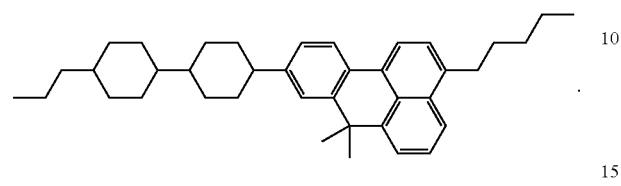

4. A process for the preparation of a liquid crystal compound according to claim 1, comprising the following steps:

(1) brominating compound P2-1 with N-bromosuccinimide (NBS) in tetrahydrofuran to obtain compound P2-2; the reaction is shown as follows:

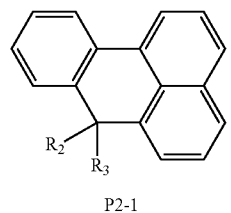

P2-1

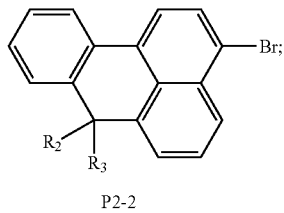

P2-2

(2) reacting compound P2-2, obtained in (1), with C1-C8 alkyl magnesium bromide in toluene in the presence of a catalyst, to obtain compound P2-3; the reaction is shown as follow:

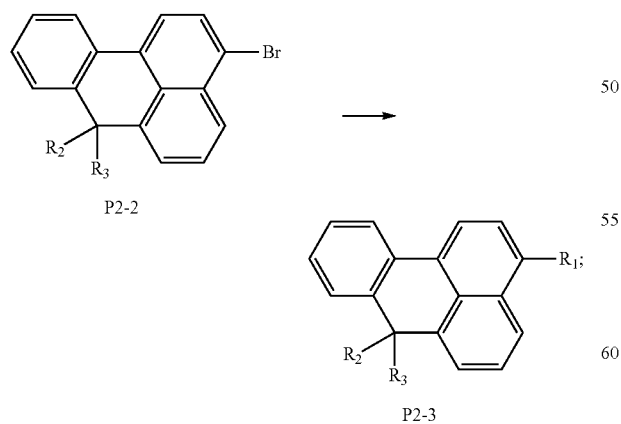

(3) brominating compound P2-3, obtained in (2), with bromine in tetrahydrofuran, to obtain compound P2-4; the reaction is shown as follow:

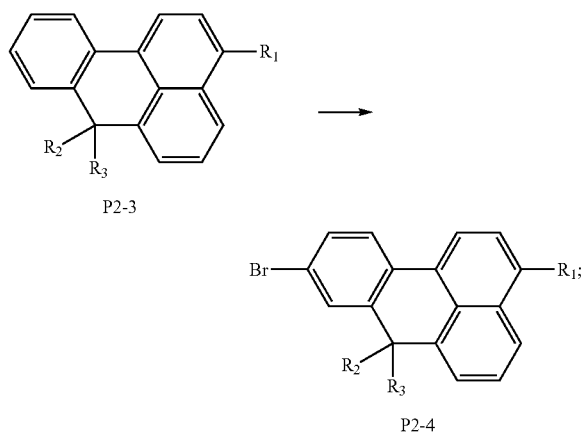

(4) preparing a Grignard reagent from compound P2-4, then adding the Grignard reagent to compound

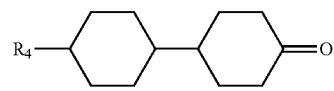

in tetrahydrofuran, and then conducting a dehydration reaction followed by a reduction reaction, to obtain compound P2; the reaction is shown as follow:

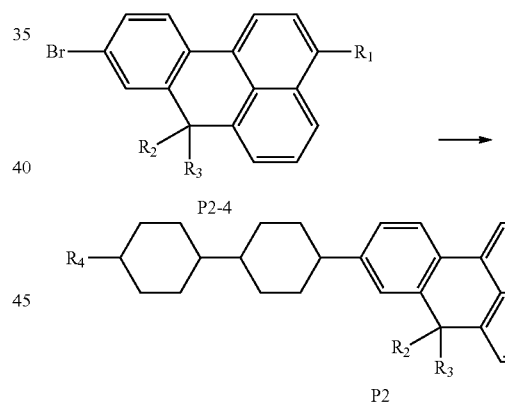

wherein, R1 is C1-C8 alkyl, R2 and R3, are C1-C6 alkyl, and R4 is C1-C6 alkyl.

5. The process according to claim 4, wherein:

(1) the molar ratio of compound P2-1 to N-bromosuccinimide is 1:1 to 1:1.1, the reaction temperature is 17° C. to 60° C., and the reaction time is 20 to 80 minutes;

(2) the molar ratio of compound P2-2 to the C1-C8 alkyl magnesium bromide is from 1:1.5 to 1:5, the reaction temperature is 0° C. to 40° C., the reaction time is 1 to 8 hours, and the catalyst is a tetrakis(triphenylphosphine) palladium;

(3) the molar ratio of compound P2-3 to bromine is 1:1 to 1:1.5, the reaction temperature is 0° C. to 20° C., and the reaction time is from 1 to 8 hours;

(4) the molar ratio of compound P2-4 to compound

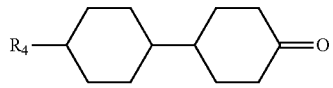

is 1:1 to 1:1.2, the reaction temperature is 10° C. to 80° C., and the reaction time is 1 to 5 hours.

6. The process according to claim 5, wherein:
(1) the molar ratio of compound P2-1 to N-bromosuccinimide is 1:1 to 1:1.05, the reaction temperature is 40° C., the reaction time is 30 to 40 minutes;
(2) the molar ratio of compound P2-2 to the C1-C8 alkyl magnesium bromide is 1:1.5 to 1:2, the reaction temperature is 30° C., and the reaction time is 3 hours, and the catalyst is tetrakis(triphenylphosphine)palladium (0);
(3) the molar ratio of compound P2-3 to bromine is 1:1 to 1:1.2, the reaction temperature is 10° C., and the reaction time is 2 to 5 hours;
(4) the molar ratio of compound P2-4 to compound

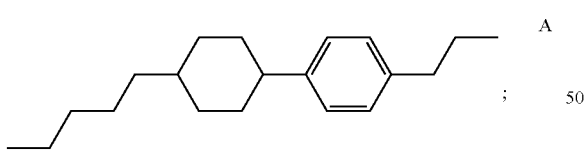

is 1:1 to 1:1.1, the reaction temperature is 60° C., and the reaction time is 3 hours.

7. A liquid crystal composition, comprising 1% to 30% by weight of a liquid crystal compound according to claim 1, based on the total weight of the liquid crystal composition.

8. The liquid crystal composition according to claim 7, comprising 5% to 20% by weight of a liquid crystal compound according to claim 1, based on the total weight of the liquid crystal composition.

9. The liquid crystal composition according to claim 7, comprising 1% to 30% by weight of liquid crystal compound P2, 0%-6% by weight of compound A:

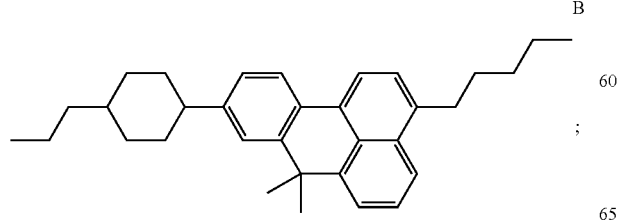

0%-4% by weight of compound B:

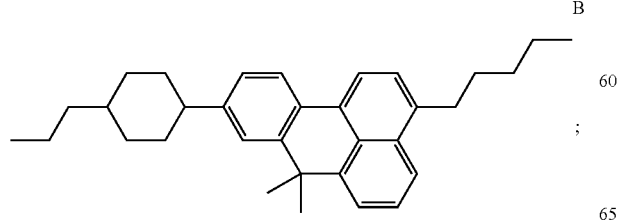

10%-18% by weight of compound C:

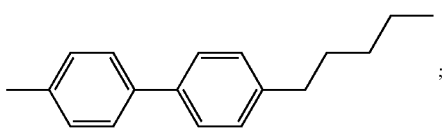

12%-33% by weight of compound D:

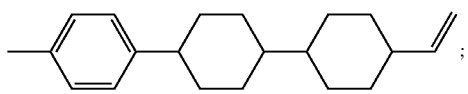

11%-12% by weight by weight of compound E:

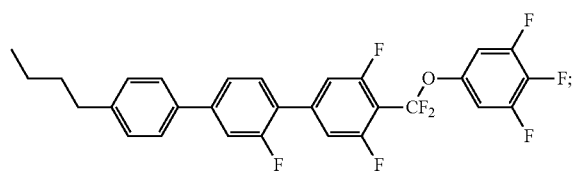 [SMILES: CCCCc1ccc(-c2ccc(-c3cc(F)c(C(F)(F)Oc4cc(F)c(F)c(F)c4)c(F)c3)c(F)c2)cc1]

6%-12% by weight of compound F:

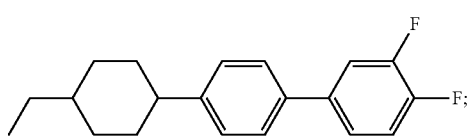

0%-10% by weight of compound G:

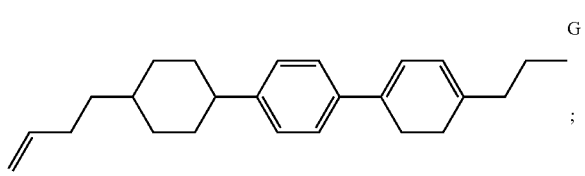 [SMILES: C=CCCC1CCC(c2ccc(C3=CC=C(CCC)CC3)cc2)CC1]

11%-20% by weight of compound P1:

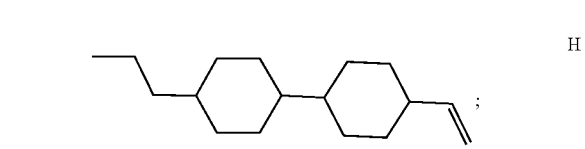 [SMILES: C=CC1CCC(C2CCC(CCC)CC2)CC1]

0%-12% by weight of compound I:

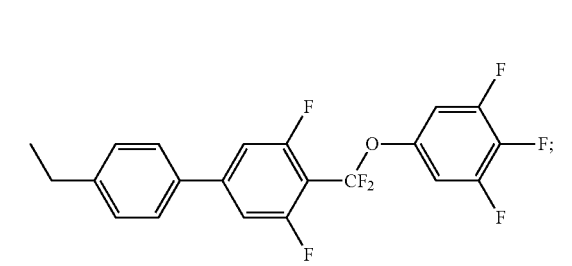

based on the total weight of the liquid crystal composition.

10. The liquid crystal composition according to claim 9, comprising: 3% by weight of compound A; 2% by weight of compound B; 13% by weight of compound C; 15% by weight of compound D; 12% by weight of compound E; 8% by weight of compound F; 6% by weight of compound G; 16% by weight of compound H; 6% by weight of compound I; and 19% by weight of a liquid crystal compound according to claim 1, based on the total weight of the liquid crystal composition.

11. A liquid crystal display panel, comprising at least one of: a liquid crystal compound according to claim 1, and a liquid crystal composition according to claim 7.

12. The liquid crystal display panel according to claim 11, comprising a first substrate, a second substrate placed on a box, and a liquid crystal layer located between the first substrate and the second substrate, wherein the liquid crystal layer comprises at least one of: a liquid crystal compound according to claim 1, and a liquid crystal composition according to claim 7.

\* \* \* \* \*